United States Patent [19]

Lyon

[11] 3,900,554
[45] Aug. 19, 1975

[54] METHOD FOR THE REDUCTION OF THE CONCENTRATION OF NO IN COMBUSTION EFFLUENTS USING AMMONIA

[75] Inventor: Richard K. Lyon, Fanwood, N.J.

[73] Assignee: Exxon Research and Engineering Company, Linden, N.J.

[22] Filed: Mar. 16, 1973

[21] Appl. No.: 341,919

[52] U.S. Cl. ............... 423/235; 423/237; 423/212
[51] Int. Cl. ............................................. C01b 21/00
[58] Field of Search ............ 252/373; 423/235, 237, 423/212, 359, 360, 361

[56] References Cited
UNITED STATES PATENTS

| | | | |
|---|---|---|---|
| 2,970,034 | 1/1961 | Andersen et al. | 423/219 |
| 3,032,387 | 5/1962 | Andersen et al. | 423/235 |
| 3,328,115 | 6/1967 | Keith et al. | 423/237 |
| 3,368,869 | 2/1968 | Gaumer | 423/359 |
| 3,479,298 | 11/1969 | Sze et al. | 252/373 |
| 3,661,507 | 5/1972 | Breitbach et al. | 423/237 |
| 3,705,009 | 12/1972 | Dougherty | 423/361 |

OTHER PUBLICATIONS

Chemical Engineer Handbook – John Perry – 4th Ed. pgs 9–31 to 9–33.

Primary Examiner—Oscar R. Vertiz
Assistant Examiner—Eugene T. Wheelock
Attorney, Agent, or Firm—John Paul Corcoran

[57] ABSTRACT

The subject invention relates to a method for reducing the concentration of NO from combustion effluents, said method comprising the step of contacting an effluent stream containing NO contamination with a sufficient amount of ammonia in the presence of a sufficient amount of $O_2$ and at a sufficient temperature to selectively reduce the NO from said combustion effluent.

34 Claims, No Drawings

METHOD FOR THE REDUCTION OF THE CONCENTRATION OF NO IN COMBUSTION EFFLUENTS USING AMMONIA

This invention relates to a method for reducing the concentration of NO from combustion effluents. In one aspect, this invention relates to contacting ammonia precursor into a combustion effluent containing NO at an elevated temperature range. In another aspect, this invention relates to injecting ammonia in the presence of $O_2$ at an elevated temperature range whereby NO is selectively reduced from combustion effluents, and reduced chiefly to molecular $N_2$ while the $O_2$ remains largely unreacted. In yet another aspect, this invention relates to injecting ammonia in the presence of a readily oxidizable gaseous material at an elevated temperature and in the presence of $O_2$ in order to selectively reduce NO from combustion effluents.

Combustion effluents and waste products from various sources have proved to be a major source of air pollution when discharged into the atmosphere. Unless the waste products are treated to remove deleterious components, serious smog problems have developed. One of the major irritants in smog is $NO_2$. $NO_2$ is an extremely poisonous material. Further in the presence of sunlight and hydrocarbons it is generally believed that $NO_2$ undergoes a series of reactions known as photochemical smog formation. Certain chemical manufacturing processes, such as nitric acid synthesis, produce waste gas effluents which contain $NO_2$, but in most urban areas this is a minor contribution to the total problem. The major source of $NO_2$ is NO formed by combustion processes. Much of the NO comes from internal combustion engines in automobiles but stationary sources such as power plants, process furnaces, incinerators and the like are also significant contributors. In these combustion processes, part of the oxygen combines with atmospheric nitrogen in the flame rather than with the fuel. This process is called nitrogen fixation and occurs in flames but not ordinarily when fuels are burned catalytically. If there are organic nitrogen compounds in the fuel, these may also form NO when the fuel is burned either by a flame or catalytically. Since NO is the only oxide of nitrogen stable at high temperatures, NO is the predominant oxide of nitrogen formed by combustion. At room temperature in air the equilibrium $2 NO + O_2 \rightleftharpoons 2 NO_2$ favors $NO_2$ but at the concentrations of nitrogen oxides normally found in combustion waste gases this reaction is well known to be a slow process. Hence, NO formed by combustion is generally discharged into the atmosphere as NO and only subsequently is converted to $NO_2$.

There have been considerable efforts in the art to find effective ways to remove oxides of nitrogen from waste gases so that said waste gases may be discharged to the atmosphere without harm to the environment. The removal of $NO_2$ is relatively easy since it reacts with water and air to form nitric acid and hence may be removed by aqueous scrubbing. If a base such as ammonia is added to the scrub water, the scrubbing process is facilitated and ammonium nitrate is produced. If limited amounts of NO are also present they may be coscrubbed and also yield ammonium nitrate. This process may also be run with all reactants initially in the vapor phase, to yield a gas containing solid particles of ammonium nitrate. Examples of this art the article by Syozo Fukui in Eisei Kagaku 13 (1), 22–8 (1968), Netherlands patent application No. 6,686,577, by Harry Pauling, Nov. 21, 1966, the article by A. A. Kabarukhina, Mater Nauch. Konf, Aspir Rostov.-na-Donu Gas. Univ. 7th, 8th, 1967, the article by M. L. Varlamov et al./in Nauchn, Zap. Odessk, Politekher. Inst. 40, 24–33 (1962), an Italian Pat. No. 683,704 issued to Harry Pauling on Feb. 27, 1965, and an article in Eisei Kagaku, J. Hyg. Chem. 13 22–28 (1967). All of these examples are subject to the limitation that they are processes which will work only for mixtures of nitrogen oxides which are predominantly $NO_2$ rather than NO. The above references fail to teach, show or suggest any method for treating waste gases in which the predominant nitrogen oxide is NO other than first converting it to a mixture in which $NO_2$ predominanates. Likewise they neither teach, show, nor suggest any process of nitrogen oxide removal which would be applicable at temperatures where NO rather than $NO_2$ is the predominant nitrogen oxide.

There have been considerable efforts to find an effective way of removing NO from combustion effluents. One of the major difficulties is that many combustion devices operate well only with excess air. This is not true of gasoline fueled internal combustion engines, but is true of diesel engines, gas turbines, power plant boilers, and process furnaces. It is also true that if the gasoline fueled internal combustion engine has an afterburner to destroy the pollutants CO and hydrocarbons, this combined system necessarily uses excess air. The combustion effluents from such devices will typically contain between 0.5 and 10 mole % $O_2$ and between 100 and 2000 ppm NO. Hence $O_2$ is present in large excess with respect to NO. Both $O_2$ and NO are oxidizing agents, but $O_2$ is well known to be generally more reactive than NO. There are means well known in the art whereby one may selectively reduce $O_2$ in the presence of NO, exactly the opposite of what one wishes to do. It is also well known to reduce both NO and $O_2$ by use of massive quantities of reducing agent, but it would clearly be desirable to find means to selectively reduce NO in the presence of $O_2$. The expense of a reducing agent in such a selective reduction of NO would correspond to the small amounts of NO to be reduced rather than the much greater amount which would be needed to reduce both NO and $O_2$.

Much of the prior art concerning NO reduction deals with the catalytic reduction of NO, and is subject to the usual disadvantage of employing catalysts, i.e. the internal expense for the catalyst, the danger that it will lose activity during use, the expense and difficulty of contacting the combustion effluents with the catalyst, the danger that the catalyst may disintegrate and be emitted as a new pollutant and similar problems.

The instant invention employs a thermal, homogeneous gas phase method of selectively reducing NO in the presence of $O_2$, and hence avoids all the difficulties of solid catalytic particle processing.

J. O. L. Wendt, C. V. Sternling and M. A. Matovich of the Shell Development Company, Emeryville, California have presented a paper entitled "Reduction of Sulfur Trioxide and Nitrogen Oxides by Secondary Fuel Injection," at the 14th Symposium (International) on Combustion. In this paper they discuss a method of pollution abatement which they term "reburning" and hold it to be applicable for the reduction of $SO_3$ and $NO_x$ emissions from coal or oil fired furnaces, boilers and incinerators, or any such source, wherever the primary flame must be operated at excess air. They injected ammonia into the post flame gas and observed a reduction of NO. However, they got very little if any reduction of NO until they had added enough ammonia to completely consume the $O_2$ present. Hence, they achieved only the nonselective reduction of NO and $O_2$. Further they teach away from the use of ammonia as a selective reducing agent as they teach the use of it as a secondary fuel which requires massive amounts. They inject the ammonia by means of a very hot stainless steel injector and suggest that the ammonia may have been pyrolyzed to $H_2$ and $N_2$ before it is injected into the combustion effluents. Hence they suggest that hydrogen may have been the reducing agent which caused their observed nonselective NO reduction.

Nanimo Enviro-Systems Corporation has also done some work in employing ammonia addition in order to remove nitrogen oxide from automobile emission systems. However, the two patent applications bearing Ser. Nos. 70,394 and 82,053 indicate that most of their work was done at temperatures below 1000°F. wherein they added the ammonia to the combustion effluents in order to remove the NO. The teaching of the subject application indicates that at these low temperatures no selective reduction in NO could be achieved and one is required to use the temperature range set forth in the subject application.

There are numerous references to the homogeneous gas phase reaction of NO and $NH_3$ in the scientific literature. These include D. R. Poole and W. M. Graven, J. Am. Chem. Soc. 83 283–6 (1961), H. Wise and M. F. Frech, J. Chem. Phy. 22 1463–4 (1954), C. P. Fenimore and J. R. Kelso, J. Am. Chem. Soc. 74 1593–4 (1952) and the errata F. Kaufman and J. R. Kelso, J. Am. Chem. Soc. 74 2894–5 (1952), C. P. Fenimore and G. W. Jones, J. Phys. Chem. 65, 298–303 (1961), P. G. R. Andrews and P. Gray, Combust. Flame 8, 113–26 (1964), G. K. Adams and G. W. Stocks, Rev. inst. franc. petrole et Ann. combustibles liquides 13, 483–96 (1953), H. G. Wolfhard and W. G. Parker, 5th Symposium on Combustion, Pittsburgh 1954 718–28 (Pub. 1955). W. G. Parker and H. G. Wolfhard 4th Symposium on Combustion, Cambridge, Mass. 1952, 420–8 (Pub. 1953). B. B. Fogarty and H. G. Wolfhard, Nature 168, 1122 (1951). M. Farber and A. J. Darnell, J. Chem. Phys. 22, 1261–3 (1954), L. J. Drummond and S. W. Hiscock Aust. J. Chem. 20, 825–36 (1967) and H. G. Wolfhard and A. Strasser, J. Chem. Phys. 28, 172–3 (1958). Most of these studies were conducted in flames or shock tubes at temperatures far in excess of the upper temperature limit for practices of the instant invention, however, the articles by Poole and Graven and Wise and Frech report observations in the temperature ranging from 850° to 1050°C. and 990° to 1150°C. respectively. Neither study observed the effect of oxygen on the rate of the NO—$NH_3$ reaction. The observed rate of NO reduction in the absence of oxygen was too slow to be of any use in air pollutions abatement.

L. K. Rendle and R. D. Wilson have worked with problems dealing in low temperature corrosion in the economizers and air-heaters of boilers which they have disclosed in British Patent bearing No. 797,439. They teach the use of ammonia for treatment of flue gases and their invention relates to a method for removing $SO_3$ from flue gas via the reaction with ammonia plus $SO_3$ plus water to yield ammonium sulfate. The Journal article teaches the injection of ammonia at about 300°C. and the patent teaches it at a range below 1000°C. and more particularly, below 500°C. First it is to be noted that in the example in the patent it is stated "The ammonia was admitted into the cool chamber" (page 3, lines 116–117) and that the temperature of the cool chamber was "300°C." (page 4, line 15). Thus, in no sense do they inadvertantly practice the selective reduction of NO. This art would not teach the selective reduction of NO from combustion effluents by operating at a specific temperature range and specific concentrations of ammonia. The patent contains no teaching concerning cooling rate of the gas, speed of mixing or the use of excess air, nor is any implied because the $SO_3$ removal process operates perfectly well with or without excess air. The mixing can be slow provided it is eventually complete and it does not matter in the slightest how fast the gas cools. The patent does teach that the amount of ammonia used ranges from 0.5 to 9.0% by weight based on the total sulfur in the fuel oil. This corresponds to injecting one mole of ammonia for every 0.0094 to 0.17 moles of $SO_2$ in the combustion gases. In general, this would not be nearly enough ammonia to reduce the NO which will be present and destruction of the ammonia by reaction with NO and $O_2$ would render the $SO_3$ removal process inoperative.

This may be made clearer by numerical example. The Federal standards for $SO_2$ are 0.8 lb $SO_2$/million BTU. For a typical fuel with a heat of combustion of 18000 BTU/lb this corresponds to 0.72 wt. % sulfur in the fuel or 380 ppm $SO_2$ in the flue gas. The teachings of Rendle and Wilson would add between 4 and 65 ppm ammonia to the flue gas. The NO concentration in the flue gas depends on both the combustion process and the amount of nitrogen in the fuel, but will typically be in the range of 200 to 400 ppm. The instant invention requires at least one mole of ammonia for every mole of NO to be removed; hence the amount of ammonia taught by Rendle and Wilson could not provide a useful NO reduction for a fuel which meets Federal standards.

It is further noted that the patent makes the statement that the ammonia is "being injected into a part of the combustion zone of said furnace beyond the flame zone at which the ammonia would be oxidized." Therefore, this patent teaches one not to inject ammonia into regions of the furnace where it will be oxidized. Again, for the purpose of $SO_3$ removal, this teaching is correct and necessary; however, the subject invention is a process for the selective oxidation of ammonia by NO and $O_2$ in order to reduce NO. Therefore, the British patent fails to teach the selective reduction of NO by the selective oxidation of ammonia since it explicitly forbids any ammonia oxidation.

In U.S. Pat. No. 3,049,872 issued to M. M. Johnson et al. on Aug. 21, 1962 entitled "Jet Engine Combustion Process", the injection of ammonia into a jet engine for the purpose of smoke abatement is taught. Claim 1 of this patent (column 8, lines 27–29) reads in part "and concomitantly injecting controlled amounts of ammonia solely and directly into the primary combustion zone." It is well known that injecting ammonia into the combustion zone is an efficient method of producing NO. Hence, this patent teaches NO production rather than NO removal.

In summary, none of the above references shows, suggests or teaches the specific application of selectively reducing NO in the presence of $O_2$ by employing a critical low concentration of ammonia so that NO is selectively removed from these various combustion effluents.

Briefly, the subject invention relates to a method for selectively removing NO from combustion effluents, said method comprising the step of contacting an effluent stream containing NO contamination with a sufficient amount of ammonia in the presence of a sufficient amount of $O_2$ and at a sufficient temperature to selectively remove the NO from said combustion effluent.

In the practice of this invention in order to obtain the selective removal of NO from combustion effluents it is important that the ammonia be contacted with the effluent in such a manner that the temperature at the point where the ammonia mixes with the No containing combustion effluents is in the range 1600° to 2000°F. and preferably from 1700° to 1900°F.

Combustion effluent in this invention means those gases which flow out from a region of combustion, be it a flame or a combustion catalyst.

A critical requirement for practicing this process is that the ammonia must be contacted with the combustion gas in the presence of oxygen. The oxygen ranges from 0.1 to 20 volume % $O_2$ based on the total volume of the effluent gas and preferably ranges from 0.1 to 11 volume % $O_2$.

The amount of ammonia ranges from 0.4 to 10 moles of ammonia per mole of NO, preferably from 0.5 to 3 moles of ammonia per mole of NO, more preferably from 0.5 to 1.5 moles of ammonia per mole of NO. The minimum required is at least one mole of ammonia per mole of NO to be removed.

The reaction may be carried out at pressures from 0.1 atmospheres to 100 atmospheres. The velocities of the combustion effluents as well as the mixing of the ammonia in the post-combustion zone are regulated so that there is a sufficient residence time to enable the ammonia to remove the NO from the combustion effluents. The residence time of the reaction ranges from 0.001 to 10 seconds.

In another embodiment, a third component which is a reducing material and which at temperatures less than 1600°F. is a readily oxidizable gas is injected in combination with the ammonia and this enables the temperature at the point where ammonia mixes with the NO containing combustion effluents to be reduced as low as 1300°F. Such materials include paraffinic, olefinic and aromatic hydrocarbons and mixtures thereof such as gasoline and fuel oil, oxygenated hydrocarbons including formic and oxalic acids, nitrogenated hydrocarbons, sulfonated hydrocarbons, carbon monoxide and hydrogen. Hydrogen is the most preferred since it is not itself an air pollutant and cannot yield an air pollutant by incomplete oxidation. If a material other than hydrogen is used to lower the temperature at which $NH_3$ selectively reduces NO, it is preferred to use said material in limited amounts so that there is a net excess of oxygen in the combustion effluents and the production of air pollutants due to incomplete oxidation is minimized. Although hydrogen has the beneficial effect of reducing the temperature at which the instant invention may be practiced, it has the disadvantage of decreasing he selectivity with which $NH_3$ reduces the NO. Indeed if excessive amounts of hydrogen are used, $NH_3$ may be oxidized to form No rather than the desired reaction of reducing NO. Accordingly, it is preferred to use a hydrogen to ammonia ratio of less than 10 and most preferably less than 3.

In still another embodiment ammonia is injected and mixed with the NO and $O_2$ containing combustion effluents at a true instantaneous gas phase temperature less than 1600°F. and then the combustion effluents are heated to a true instantaneous gas phase temperature greater than 1600°F.

In yet another embodiment ammonia and a third reducing component which at temperatures less than 1600°F. is a readily oxidizable gas are injected and mixed with the combustion effluents at a true instantaneous gas phase temperature less than 1300°F. and then the combustion effluents are heated to a true instantaneous gas phase temperature greater than 1300°F.

In still another embodiment the ammonia is injected in combination with hydrogen, and said hydrogen is produced by the catalytic decomposition of ammonia. For this purpose a separate catalyst may be used or one may allow the injection device to provide in situ decomposition of the ammonia.

In yet another embodiment the third reducing component which is at temperatures less than 1600°F. a readily oxidizable gas is injected in one or more stages after the ammonia injection. Said injection or injections to be done in such a manner that the true instantaneous gas phase temperature at the point where said third component mixes with the combustion effluents is in the range 1300°F. to 2000°F. The advantage of this procedure is that in this manner one may add enough of said third component to insure that the reduction of NO by $NH_3$ will occur even at true instantaneous gas phase temperatures as low as 1300°F., but the danger that at higher temperature said third component will cause the undesirable oxidation of ammonia to NO is avoided.

In still another embodiment ammonia is stored prior to use in a form other than the pure substance and is employed as a precursor. Useful forms of ammonia include its solution in water, the compounds ammonium carbonate, ammonium formate and ammonium oxalate, and their solutions in water. All of the above substances will yield ammonia on vaporization, while the formate and oxalate also yield formic acid and oxalic acid respectively. Said vaporization may be done as a separate step or by injection into the hot exhaust gas as desired. If vaporization of ammonium formate or ammonium oxalate or their solutions in water is done as a separate step, then one may, if desired, decompose the formic acid and/or the oxalic acid to form hydrogen by either thermal or catalytic means prior to injection into the hot gases.

In yet another embodiment this invention is a method of controlling automotive air pollution. The exhaust gas from the engine contains the pollutants CO and unburned hydrocarbons as well as NO. If the exhaust gas contains excess oxygen or excess oxygen is added to it, the CO and hydrocarbons may be oxidized to $CO_2$ and water by any of the thermal or catalytic reactors well known in the art. After this the exhaust gas flows through a reactor and ammonia is injected into it. If the exhaust gas temperature is too low for adequate reduction of NO by $NH_3$ in the reaction time available in the reactor, an appropriate amount of hydrogen is injected, either concurrently with the ammonia or after the injection of ammonia at one or more intervals downstream of the ammonia injection point. The advantage of using several stages of hydrogen injection is that in this manner one may add enough hydrogen to insure that the reduction of NO by $NH_3$ will occur even at temperatures as low as 1300°F, but the concentration of hydrogen at any point in the reactor is kept low and hence the danger that hydrogen will cause the undesirable oxidation of ammonia to NO is avoided.

The following examples serve to illustrate the subject invention.

EXAMPLE 1

Using calibrated gas flow meters a flowing gas stream of known composition was prepared. This stream was conducted through an electrically heated furnace and thence to an NO meter. The results of these experiments are shown in Table I. In accord with the literature no effective reduction of NO was observed in the absence of $O_2$ throughout the temperature range 1240°F to 2000°F, while substantial reductions were obtained in the presence of $O_2$ between 1600°F and 2000°F. It should also be noted that below 1600°F $NH_3$ was ineffective for NO reduction, while above 2000°F the use of $NH_3$ was contraproductive increasing NO rather than decreasing it.

For a nonselective reduction of NO one would expect substantial NO reduction to occur only when enough $NH_3$ was put in to consume both the NO and the $O_2$. For $NH_3$ reducing $O_2$ according to the equation $4/3\ NH_3 + O_2 \rightarrow 2\ H_2O + 2/3\ N_2$, the reduction of 4.6% $O_2$ would require 6.13% $NH_3$. The data in Table I show substantial NO reduction for $NH_3$ inputs much smaller than 6.13% throughout the range 1600°F to 2000°F, hence the data clearly illustrate the selective reduction of NO.

EXAMPLE 2

Using the procedures described above, another set of experiments was done, the results of which are shown in Table II. These results illustrate that in the most preferred temperature range, 1700°F to 1900°F, the instant invention provides a rapid and very highly selective reduction of NO. It also illustrates that if $O_2$ is present in substantial excess over NO, the exact amount of $O_2$ present is not critical.

EXAMPLE 3

Using the above experimental procedures experiments were done using both $NH_3$ and $H_2$ and the results shown in Table III were obtained. These results illustrate the effectiveness of hydrogen in lowering the temperature at which $NH_3$ will selectively reduce NO.

EXAMPLE 4

A gas mixture of 2.2% $O_2$, 0.23% $H_2$ and 0.018% $NH_3$ and balance He was flowed through a tube heated to 1800°F, the reaction time being 0.075 sec. The gas coming out of the tube was found to contain 0.012% NO. This illustrates that if one uses hydrogen to ammonia ratios greater than 10, the $NH_3$ may be oxidized to No instead of serving as an NO reducing agent.

EXAMPLE 5

A mixture of 1% CO, 0.102% NO, and 2.2% $O_2$, balance He was flowed through a quartz tube at 1500°F, the reaction time being 0.086 sec. The output NO was observed to be 0.102%. This illustrates that in the absence of catalysts CO is ineffective for No reduction. When 0.151% $NH_3$ was added to this flowing mixture, the NO output was decreased to 0.019% by vol. This illustrates that CO is effective in reducing the temperature at which $NH_3$ reduces NO in the presence of excess $O_2$.

EXAMPLE 6

A mixture of 13% $CO_2$; 4.5% $O_2$, 0.17% NO, 5.7% He and balance $N_2$ was passed through a hot quartz tube at 1500°F with a reaction time of 0.2 sec. The observed NO output is 0.17%. When 0.215% $NH_3$ was added to the flowing gases, the NO output was decreased to 0.16%, a trivial decrease. If only 0.01% $C_2H_4$ was also added, the NO output decreased to 0.025%, but if 0.01% $C_2H_4$ was added without $NH_3$, the NO output was 0.17%. This illustrates that $C_2H_4$ is not by itself effective for NO reduction under conditions where oxygen is in large excess, however, it shows that the temperature at which $NH_3$ reduces NO may be reduced by $C_2H_4$. The above experiment was repeated using $iC_4H_{10}$. Without $NH_3$, the addition of 0.01% $iC_4H_{10}$ caused no decrease in NO output but 0.01% $iC_4H_{10}$ and 0.215% $NH_3$ decreased the NO output to 0.027%. This illustrates that $iC_4H_{10}$ is effective for decreasing the temperature at which $NH_3$ will reduce NO, but $iC_4H_{10}$ by itself is ineffective for NO reduction when oxygen is in large excess.

EXAMPLE 7

A mixture of 13% $CO_2$, 4.5% $O_2$, 0.19% NO, 5.7% He and balance $N_2$ was passed through a hot quartz tube at 1530°F with a reaction time of 0.2 sec. The NO output was 0.19%. When 0.215% $NH_3$ and 0.24% $CH_3OH$ were injected the NO output dropped to 0.13%. When 0.215% $NH_3$ and 0.45% acetone were injected the NO output dropped to 0.057%. When 0.215% $NH_3$ and 0.08% xylene were injected, the NO output dropped to 0.11%.

TABLE I

| | Inputs, Balance $N_2$ | | | Temp. °F Reaction Time, Sec. Output NO, ppm | 1240 0.18 | 1330 0.17 | 1380 0.16 | 1500 0.15 | 1600 0.15 | 1690 0.14 | 1760 0.14 | 1870 0.13 | 1960 0.13 | 2000 0.12 | 2200* 0.009 |
|---|---|---|---|---|---|---|---|---|---|---|---|---|---|---|---|
| Run | $O_2$, %** | $NH_3$, ppm | NO, ppm | | | | | | | | | | | | |
| 1 | 4.6 | 650 | 853 | | 855 | 867 | 844 | 822 | 833 | 556 | 378 | 377 | 411 | 422 | Not measured |
| 2 | 4.6 | 2540 | 826 | | 822 | 822 | 800 | 755 | 511 | 13.9 | 5.8 | 9.9 | 64 | 104 | Not measured |
| 3 | 4.6 | 4540 | 800 | | 800 | 777 | 744 | 667 | 133 | 11.1 | 5.3 | 6.9 | 9.3 | 156 | Not measured |
| 4 | 4.6 | 6990 | 760 | | 756 | 733 | 688 | 600 | 97 | 3.6 | 6.0 | 7.3 | 7.6 | 211 | Not measured |
| 5 | 4.6 | 8500 | 740 | | 722 | 700 | 644 | 555 | 74 | 3.5 | 6.9 | 8.0 | 7.8 | 272 | Not measured |
| 6 | 1.06 | 750 | 540 | | | | | | | | | | | | 800 |
| 7 | Nil | 8500 | 878 | | 877 | 867 | 856 | 844 | 844 | 800 | 744 | 722 | 544 | 378 | |

*In this run the balance was He.
**In this table and throughout the examples % and ppm are by gas volume. Run 6 demonstrates that at 2200°F, NO is produced and is not reduced in concentration.

TABLE II

Gas Composition 0.102% NO, O₂ as Noted, He Balance
1800°F, 0.075 sec. reaction time

| NH₃ % of Input | NO, ppm Output | | |
|---|---|---|---|
|  | $O_2 = 0$ | $O_2 = 0.5\%$ | $O_2 = 2.2\%$ |
| 0 | 1020 | 1020 | 1020 |
| .02 | 1020 | 850 | 930 |
| .04 | 1010 | 710 | 760 |
| .059 | 1000 | 520 | 520 |
| .088 |  | 360 | 290 |
| .119 | 990 | 130 | 100 |
| .151 | 970 | 20 | 50 |
| .42 | 880 | 30 | 10 |
| .62 | 880 | 20 | 10 |

TABLE III

Input Gas = 2.2%, O₂ + 0.102% NO + variable amounts of NH₃ and H₂, balance He
$H_2/NH_3 = 2.4$

| NH₃ % Input | H₂ % Input | NO ppm, Output | | |
|---|---|---|---|---|
|  |  | 1200°F 0.100 | 1300°F 0.095 sec | 1400°F 0.090 sec |
| 0 | 0 | 1020 | 1020 | 1020 |
| .04 | .096 | 1020 | 940 | 660 |
| .13 | .31 | 1020 | 200 | 240 |
| .27 | .65 | 1020 | 70 | 20 |
| .44 | 1.06 | 1020 |  | 10 |
| .65 | 1.56 | 1020 | 50 | 10 |
| .87 | 2.09 | 1020 | 40 | 10 |

What is claimed is:

1. A process for selectively reducing NO in a combustion effluent, said process comprising the step of contacting an effluent stream containing NO in the presence of oxygen with a compound selected from the group consisting of ammonia, ammonium formate, ammonium oxalate, ammonium carbonate, and their aqueous solutions, said compound being present in an amount sufficient to provide an equivalent mole ratio of ammonia ranging from 0.4 to 10 moles per mole of NO, but not more than about 0.9 volume percent based on the total volume of said effluent stream, and in the presence of a reducing material in such a manner that the true temperature where said compound and said reducing material react with the NO containing combustion effluent ranges from 1300° to 2000°F., whereby the NO is selectively reduced, said reducing material being one selected from the group consisting of paraffinic, olefinic and aromatic hydrocarbons, oxygenated hydrocarbons, sulfonated hydrocarbons, carbon momoxide and hydrogen, but not in an amount more than about 2 volume percent based on the total volume of said combustion effluent and the amount of oxygen is at least enough to have some oxygen left after oxidation of said compound and said reducing material.

2. A process according to claim 1 wherein the amount of ammonia ranges from 0.5 to 3 moles per mole of NO in the combustion effluent.

3. A process according to claim 1 wherein the amount of ammonia ranges from 0.5 to 1.5 moles per mole of NO in the combustion effluent.

4. A process according to claim 1 wherein the amount of ammonia is stoichiometric with the amount of NO in the combustion effluent.

5. A process according to claim 1 for selectively reducing NO in combustion effluents, said process comprising the step of contacting an effluent stream containing NO in the presence of an amount of oxygen ranging from 0.1 to 20 volume % based on the total volume of said effluent stream with an amount of ammonia ranging from 0.4 to 10 moles of ammonia per mole of NO in said effluent stream, but not to exceed about 0.9 volume percent based on total volume of said effluent stream and in the presence of either formic or oxalic acid, wherein said acid is present in an amount not to exceed about 2 volume percent based on the total volume of said combustion effluent, said contacting being done in such a manner that the true temperature at the point where the ammonia and either the formic or oxalic acid reacted with the NO containing combustion effluents is in the range of 1300° to 2000°F., whereby the NO is selectively reduced.

6. A process according to claim 1 further including the step of storing the ammonia in formic acid or oxalic acid as with ammonium formate, ammonium oxalate or water solutions thereof prior to the contacting step.

7. A process according to claim 1 for selectively reducing NO from combustion effluents, said process comprising the step of contacting an effluent stream containing NO in the presence of an amount of oxygen ranging from 0.1 to 20 volume % based on the total volume of the combustion effluent with a sufficient amount of ammonia ranging from 0.5 to 3 moles per mole of NO present in the said effluent stream, but not to exceed about 0.9 volume percent based on the total volume of said effluent stream and in the presence of hydrogen, said hydrogen being present in an amount not to exceed about 2 volume percent based on the total volume of said effluent stream, said contacting being done in such a manner that the true temperature at the point where the ammonia and hydrogen react with the NO containing combustion effluents ranges from 1300° to 2000°F., whereby the NO is selectively reduced.

8. A process according to claim 7 wherein the hydrogen to ammonia ratio is less than 10 moles of hydrogen per mole of ammonia.

9. A process according to claim 7 wherein the hydrogen to ammonia ratio is less than 3 moles of hydrogen per mole of ammonia.

10. A process according to claim 7 wherein the amount of oxygen ranges from 0.1 to 20 volume percent based on the total volume of the combustion effluent, wherein the residence time of the contacting step is maintained at a range from 1 millisecond to 10 seconds, and further including the step of mixing thoroughly the ammonia and hydrogen with the combustion effluent.

11. A process according to claim 10 further including the step of mixing hydrogen thoroughly with the combustion effluents at one or more stages downstream from the ammonia injection.

12. A process according to claim 7 further including the step of storing the ammonia and hydrogen in any form which on heating yields ammonia and hydrogen.

13. A process according to claim 7 further including the step of storing the ammonia and hydrogen prior to use in any form which on heating and subsequent decomposition yields ammonia and hydrogen.

14. A process according to claim 13 wherein the ammonia and hydrogen are stored in a form selected from the group consisting of ammonium oxalate, ammonium formate, and aqueous solutions thereof.

15. A process according to claim 7 wherein the hydrogen is produced by catalytic decomposition of ammonia.

16. A process according to claim 15 wherein the catalytic decomposition of the ammonia occurs in situ in an injection device.

17. A process according to claim 1 further including the step of mixing said third component thoroughly with the combustion effluents at one or more stages downstream from the ammonia injection.

18. A process according to claim 1 wherein the ammonia and said third component are mixed with the NO containing combustion effluents at a true instantaneous gas phase temperature less than 1300°F and including the further step of subsequently heating the combustion effluents to a true instantaneous gas phase temperature greater than 1300°F.

19. A process for selectively reducing NO in a combustion effluent, said NO being in the range of 5 ppm to 10,000 ppm, said process comprising the step of contacting an effluent steam containing NO, in the presence of oxygen, with a compound selected from the group consisting of ammonia, ammonium formate, ammonium oxalate, ammonium carbonate and aqueous solutions thereof, wherein the amount of oxygen is at least enough to have some oxygen left after complete oxidation of said compound, said compound being present in an amount sufficient to provide an equivalent mole ratio of ammonia ranging from 0.4 to 10 moles per mole of NO, but not more than about 0.9 volume percent based on the total volume of said effluent stream; in such a manner that the true temperature where the ammonia reacts with the NO containing combustion effluent ranges from 1600° to 2000°F. to thereby selectively reduce at least part of the NO in said combustion effluent.

20. A process according to claim 19 wherein the temperature ranges from 1700° to 1900°F.

21. A process according to claim 19 wherein the amount of oxygen ranges from 0.1 volume percent to 20 volume percent based on the total volume of the combustion effluent.

22. A process according to claim 19 wherein a residence time of the contacting step is maintained at a range from 1 millisecond to 10 seconds.

23. A process according to claim 19 further including the step of thoroughly mixing the ammonia with the combustion effluent.

24. A process according to claim 19 wherein the amount of ammonia ranges from 0.5 to 10 moles of ammonia per mole of NO in the combustion effluent.

25. A process according to claim 19 wherein the amount of ammonia ranges from 0.5 to 3 moles of ammonia per mole of NO in the combustion effluent.

26. A process according to claim 19 wherein the amount of ammonia ranges from 0.5 to 1.5 moles of ammonia per mole of NO in the combustion effluent.

27. A process according to claim 19 wherein the amount of ammonia is stoichiometric with the amount of NO in the combustion effluent.

28. A process according to claim 24 wherein the amount of oxygen ranges from 0.1 to 20 volume percent based on the total volume of the combustion effluent, wherein the residence time of the contacting step is maintained at a range from 1 millisecond to 10 seconds, and further including the step of thoroughly mixing the ammonia with the combustion effluent.

29. A process according to claim 28 further including the step of storing the ammonia prior to use in a carrier which on vaporization frees the ammonia.

30. A process according to claim 28 wherein the carrier is water.

31. A process according to claim 19 wherein the ammonia is contacted with the combustion effluents at a true temperature less than 1600°F, and further including the step of subsequently heating said combustion effluents above 1600°F.

32. A process according to claim 19 wherein the ammonia is mixed with the NO containing combustion effluents at a true instantaneous gas phase temperature less than 1600°F and including the step of subsequently heating the combustion effluents to a true instantaneous gas phase temperature greater than 1600°F.

33. A process according to claim 1, wherein the temperature ranges from 1700° to 1900°F.

34. A process according to claim 1, wherein the temperature ranges from 1300° to 1600°F.

* * * * *